(12) United States Patent
Aronovich et al.

(10) Patent No.: US 10,613,885 B2
(45) Date of Patent: Apr. 7, 2020

(54) PORTABLE AGGREGATED INFORMATION CALCULATION AND INJECTION FOR APPLICATION CONTAINERS

(71) Applicant: INTERNATIONAL BUSINESS MACHINES CORPORATION, Armonk, NY (US)

(72) Inventors: Lior Aronovich, Thornhill (CA); Shibin I. Ma, Scarborough (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 86 days.

(21) Appl. No.: 15/441,526

(22) Filed: Feb. 24, 2017

(65) Prior Publication Data

US 2018/0246745 A1 Aug. 30, 2018

(51) Int. Cl.
*G06F 9/455* (2018.01)

(52) U.S. Cl.
CPC .................. *G06F 9/45545* (2013.01)

(58) Field of Classification Search
CPC .................................... G06F 9/45533
USPC ............................................. 718/1
See application file for complete search history.

(56) References Cited

U.S. PATENT DOCUMENTS

| | | | |
|---|---|---|---|
| 7,814,491 B1* | 10/2010 | Chen | G06F 9/5016 709/226 |
| 9,122,562 B1* | 9/2015 | Stickle | G06F 8/71 |
| 9,524,183 B1* | 12/2016 | Phelan | G06F 9/45558 |
| 9,983,891 B1* | 5/2018 | Christensen | G06F 8/63 |
| 2002/0026592 A1 | 2/2002 | Gavrila et al. | |
| 2005/0102175 A1* | 5/2005 | Dudat | G06Q 10/04 705/7.31 |
| 2010/0122343 A1* | 5/2010 | Ghosh | G06F 21/55 726/23 |
| 2012/0030243 A1 | 2/2012 | Ishikawa | |
| 2013/0080814 A1* | 3/2013 | Cong | G06F 1/3206 713/340 |
| 2013/0219176 A1 | 8/2013 | Akella et al. | |
| 2014/0244675 A1* | 8/2014 | Cavazos | G06F 17/30864 707/758 |
| 2015/0089575 A1 | 3/2015 | Vepa et al. | |
| 2015/0142878 A1 | 5/2015 | Hebert et al. | |
| 2015/0378708 A1* | 12/2015 | Nagaraja | G06F 8/60 717/177 |
| 2015/0379287 A1* | 12/2015 | Mathur | G06F 21/6209 726/27 |

(Continued)

OTHER PUBLICATIONS

List of IBM Patents or Patent Applications Treated as Related dated Feb. 27, 2017 (2 pages).

*Primary Examiner* — Mehran Kamran
(74) *Attorney, Agent, or Firm* — Griffiths & Seaton PLLC

(57) ABSTRACT

Embodiments for aggregated information calculation and injection for application containers by one or more processors. Prior to commencing execution of an application inside a working container, a temporary container having an equivalent application template or container template as the working container is started. Relevant information from inside the temporary container and relevant information from a host associated with the application is extracted. Aggregated information is calculated based on the extracted relevant information from inside the temporary container and from the host.

18 Claims, 8 Drawing Sheets

(56) References Cited

U.S. PATENT DOCUMENTS

| | | | |
|---|---|---|---|
| 2016/0098285 A1* | 4/2016 | Davis | G06F 9/45545 718/1 |
| 2016/0110324 A1* | 4/2016 | Hao | G06F 17/30896 715/242 |
| 2016/0162320 A1* | 6/2016 | Singh | G06F 9/5055 718/1 |
| 2016/0162779 A1* | 6/2016 | Marcus | G06N 99/005 706/12 |
| 2016/0179509 A1* | 6/2016 | Raghavan | G06F 8/71 717/121 |
| 2016/0182315 A1* | 6/2016 | Salokanto | H04L 41/5054 709/226 |
| 2016/0378545 A1* | 12/2016 | Ho | G06F 9/50 718/107 |
| 2017/0048318 A1* | 2/2017 | Hebert | H04L 67/1097 |
| 2017/0061146 A1* | 3/2017 | Lu | G06F 21/6272 |
| 2017/0168778 A1* | 6/2017 | Brandys | G06F 8/24 |
| 2017/0201597 A1* | 7/2017 | Narasimhan | H04L 67/327 |
| 2017/0257357 A1* | 9/2017 | Wang | G06F 8/63 |
| 2017/0269978 A1* | 9/2017 | Engel | G06F 9/541 |
| 2017/0322824 A1* | 11/2017 | Reuther | G06F 3/0604 |
| 2017/0353496 A1 | 12/2017 | Pai et al. | |
| 2018/0032258 A1* | 2/2018 | Edwards | G06F 3/065 |
| 2018/0181454 A1* | 6/2018 | Lin | G06F 3/064 |

\* cited by examiner

| APPLICATION # | 1 | 2 | ... | N |
|---|---|---|---|---|
| CONTAINER TEMPLATE | | | | |
| CONTAINER ENGINE | | | | |
| COMMAND | | | | |
| INJECTION AGENT | | | | |
| AGGREGATION MODE | | | | |
| EXECUTION USER | | | | |
| HOST INFORMATION METRIC | | | | |
| OTHER INFORMATION | | | | |

PORTABLE AGGREGATED INFORMATION CALCULATION AND INJECTION FOR APPLICATION CONTAINERS

CROSS-REFERENCE TO RELATED APPLICATIONS

This Application is related to Applications having U.S. application Ser. Nos. 15/441,544 and 15/441,535, filed on even date as the present Application.

BACKGROUND OF THE INVENTION

Field of the Invention

The present invention relates in general to computing systems, and more particularly to, various embodiments for providing application information management in a containerized environment.

Description of the Related Art

In today's interconnected and complex society, computers and computer-driven equipment are more commonplace. Processing devices, with the advent and further miniaturization of integrated circuits, have made it possible to be integrated into a wide variety of personal, business, health, home, education, and other devices. Accordingly, the use of computers, network appliances, and similar data processing devices continue to proliferate throughout society.

Application "containerization" is an operating system level (OS-level) virtualization method for deploying and running distributed applications without launching an entire virtual machine (VM) for each application. Instead, multiple isolated systems are run on a single control host and access a single operating system kernel. The application containers hold the components such as files, libraries, and environment configuration necessary to run the desired software. Containerization may result in efficiency gains in memory, processing, and storage compared to traditional virtualization.

SUMMARY OF THE INVENTION

Various embodiments for aggregated information calculation and injection for application containers by one or more processors, are provided. In one embodiment, by way of example only, a method comprises, prior to commencing execution of an application inside a working container: starting a temporary container having an equivalent application template or container template as the working container; extracting relevant information from inside the temporary container and relevant information from a host associated with the application; calculating aggregated information based on the extracted relevant information from inside the temporary container and from the host; and injecting the calculated aggregated information into the working container thereby efficiently propagating configuration attributes of the application into the working container.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5 is a block diagram depicting an exemplary required data structure of components in accordance with aspects of the present invention;

DETAILED DESCRIPTION OF THE DRAWINGS

Figure 1:
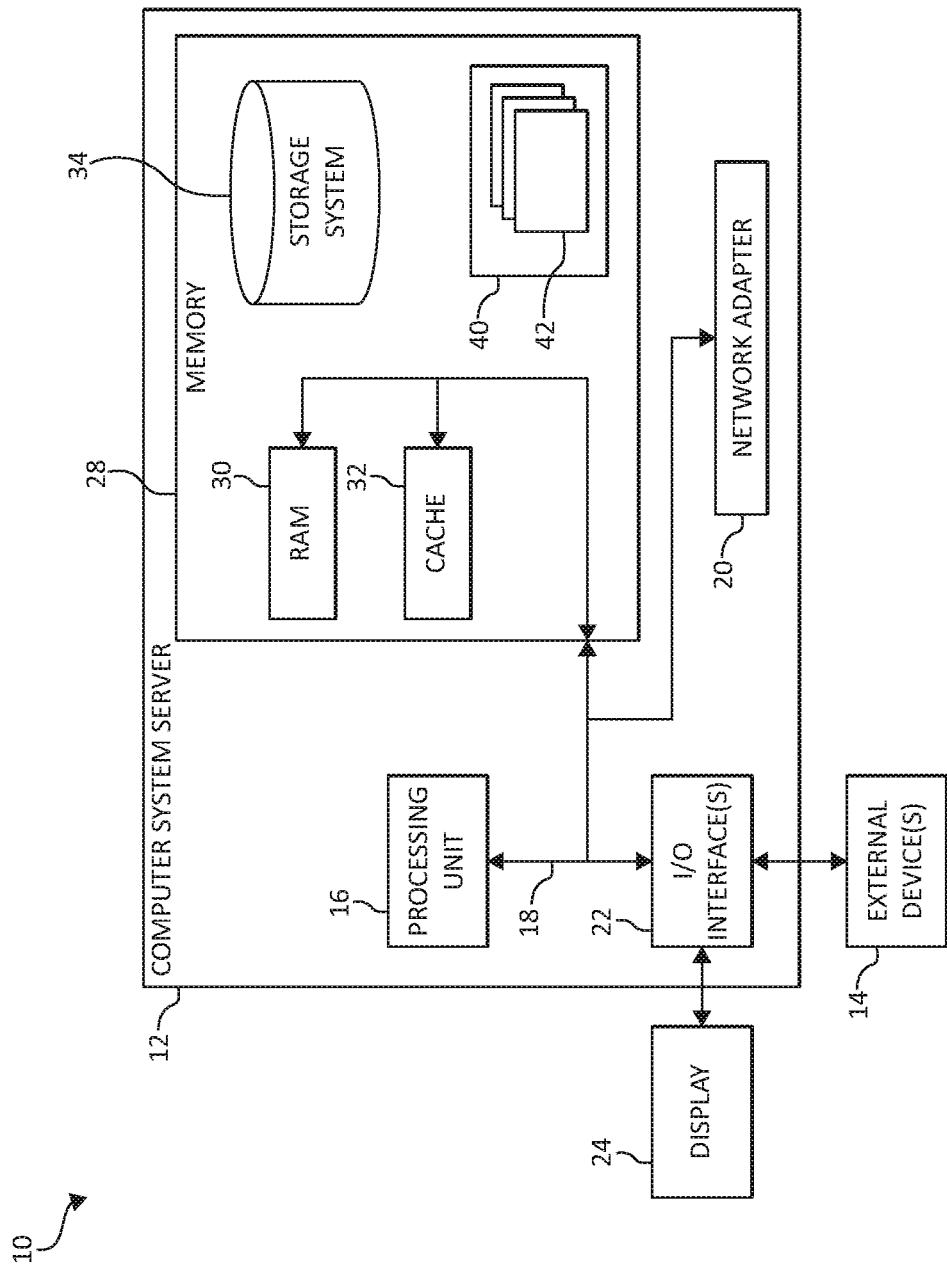
FIG. 1 is a block diagram depicting an exemplary computing node according to an embodiment of the present invention.

As aforementioned, application "containerization" is an operating system level (OS-level) virtualization method for deploying and running distributed applications without launching an entire virtual machine (VM) for each application. Instead, multiple isolated systems are run on a single control host and access a single operating system kernel. The application containers hold the components such as files, libraries, and environment configuration necessary to run the desired software. Application containers place less strain on the overall computing resources available, as they share the operating system kernel, and may also share resources such as storage and networking.

Containerization may result in efficiency gains in memory, processing, and storage compared to traditional virtualization. Because application containers do not have the overhead required by VMs, it is possible to support many more containers on the same infrastructure. Application containers may also be migrated to other computing environments, such as computing systems, clouds, or other environments without requiring code changes. Accordingly, a potential benefit of application containers includes portability across various platforms.

Thus, application containers enable users to create, execute, isolate and scale applications in a light-weight, flexible and portable manner, and, as aforementioned, users can deploy these application containers in a variety of computing environments and/or on multiple computing devices. For example, a user may encapsulate a traditional host based application and its dependencies such as libraries, configuration files, entitlement information, etc. into one application container or a group of application containers.

These containers can be deployed to a variety of contexts such as a private computing cluster or a public cloud.

By design, containers are isolated from the deployment environment in which they are running in aspects such as their namespaces, available resources, file system, environment variables and configuration. However, there are cases where it is useful to share information between the container environment and the host environment in which it runs for various purposes. Following are two example use cases illustrating various techniques for resolving this issue and further challenges created in doing so.

One example is to apply host level data access control inside application containers. Some embodiments of application containers support data volumes mounted inside containers and decouple the lifecycle of data from the lifecycle of the containers, to enable applications running inside the container to persist data. However, the isolation of a container, and its access to data volumes from the host environment it runs in, presents a problem for applying access control to data on such volumes. For instance, in POSIX-based file systems, security and access control are primarily based on file permissions: a system administrator can give different read, write and execute privileges to the owner of the file, the assigned group of the file, and other users. Specific access control permissions can thereby be granted to individual users in addition to groups of users, and advanced permissions also exist to enable users to run an application with the permissions of the application's owner or group, respectively.

Unfortunately, due to the isolated nature of an application container, the user namespace inside the container is inherently different from the user space of the host in which the container is running. Therefore, when a host data volume is mounted inside an application container, the file permissions and access control rules, which are carefully designed and enforced for host users, will be compromised or completely invalidated, inside the container. Failure to correctly interpret and enforce host access control imperatives inside the container presents a problem for implementing data security and access control in containers.

Another example is dynamic configuration of applications running inside containers. Many applications require configuration information to be partly or wholly calculated dynamically based on information retrieved from the host. Configuration information stored inside containers is, by design, static and isolated from the host environment. Therefore, a further case of the above problem is how to combine the configuration information inside a container with host level information to calculate dynamic configuration information for applications running inside a container.

The mechanisms of the illustrated embodiments hence provide solutions to the underlying dilemma discussed in which a variety of runtime information must be calculated based on information inside a container and from the host environment, and such runtime information must be provided back into the container prior to the execution of the applications inside the container. These mechanisms include such functionality as to start a transient application container of the same container template that would be used by the actual working container, extract and calculate relevant information according to the specification in the application template and inject this information back into the actual working container.

The advantage of such functionality includes (1) Portability: the illustrated embodiments assume no preexisting knowledge of the underlying system or application container; (2) Runtime resolution: information is retrieved on-demand and no hard coded information is needed; (3) Self-reflection: the illustrated embodiments can enable the application container to understand the relevant host information; and (4) Security: host information is only exposed inside the container on a need-to-know basis.

Additional aspects of the present invention and attendant benefits will be further described, following.

It should be noted that the term "application container", as used herein, generally refers to any software technology that provides an encapsulated application in a contained environment that is isolated from other applications running within the operating system. Application containers are generally more light-weight, compared to traditional virtual machines which usually host an entire operating system. Application containers, on the other hand, reuse the host operating system kernel, and possibly other resources such as storage and networking. An application software stack and all its required components are packaged into a container template, which is a basis for creating running containers based on the template. These templates may be stored in a container templates library that is hosted either locally or can be retrieved remotely using application programming interfaces.

In addition, the term "application", as used herein, generally refers to any type or form of software, file, and/or executable code that may be installed, run, deployed and/or implemented on a computing system. Examples of applications include, without limitation, internet applications, database systems, communication systems, text and number processing applications, etc.

Further, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
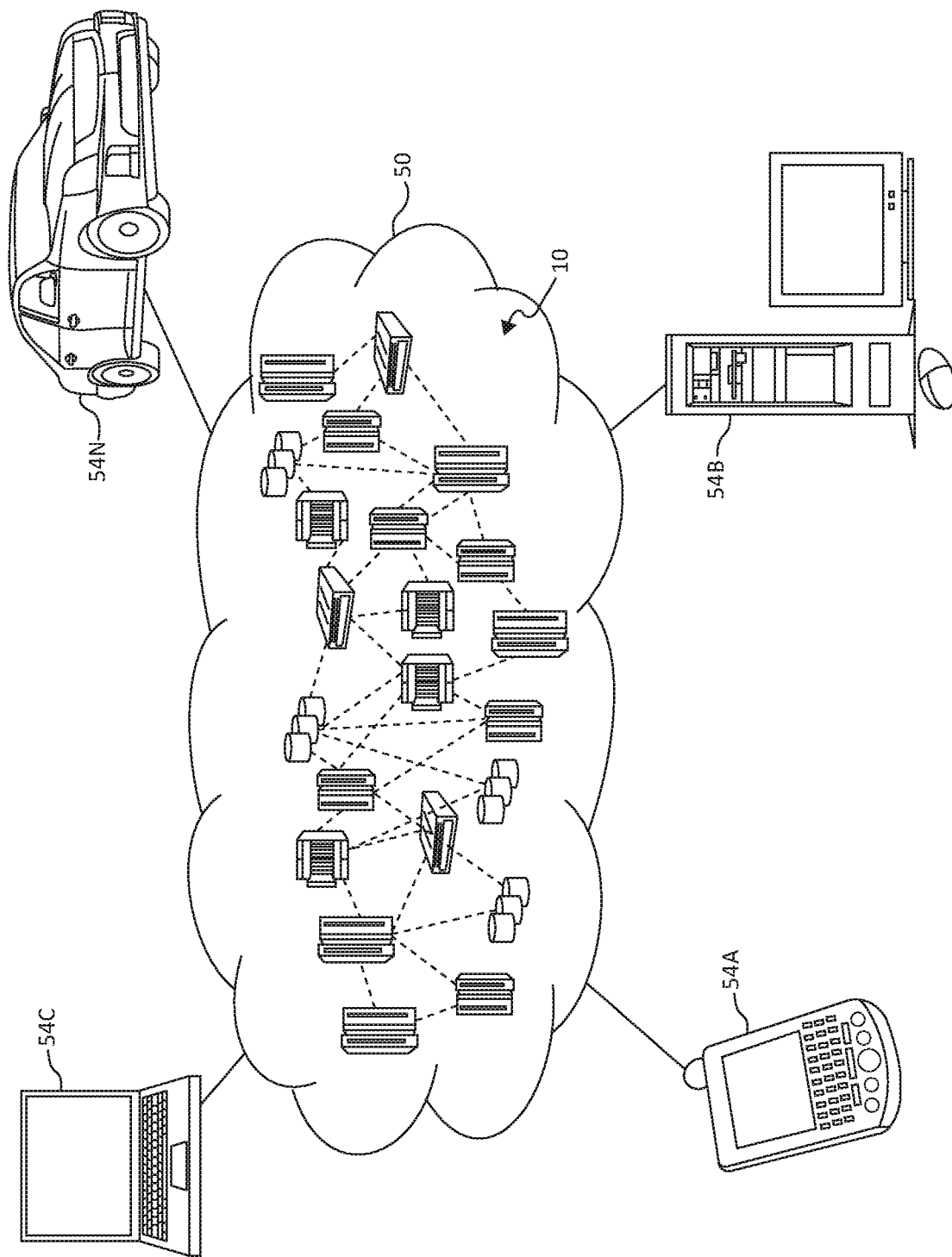
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
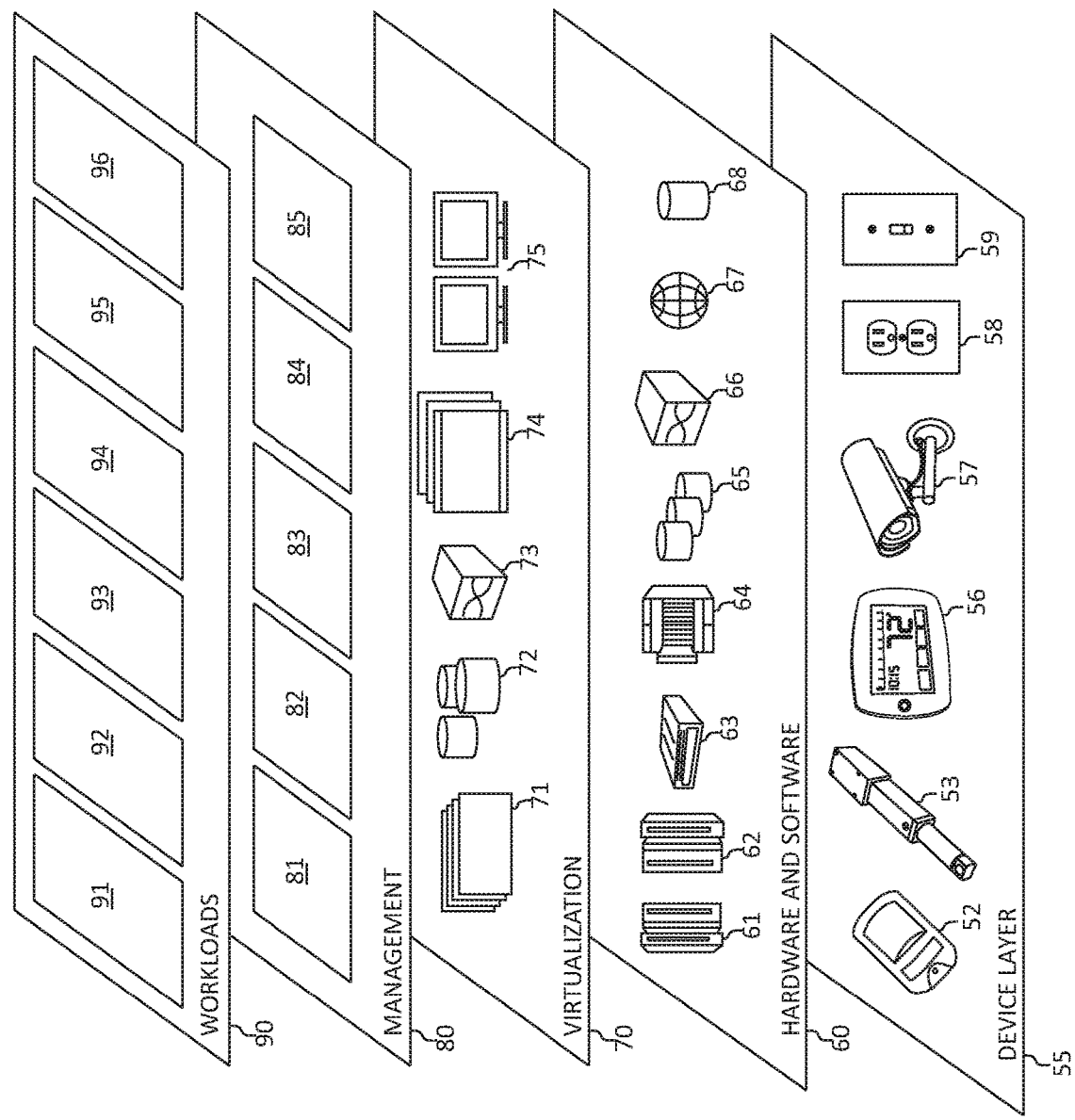
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various information extraction and aggregation functions 96. In addition, information extraction and aggregation functions 96 may include such operations as analyzing certain data and injection of the certain data into application container operations as will be further described. One of ordinary skill in the art will appreciate that the information extraction and aggregation functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
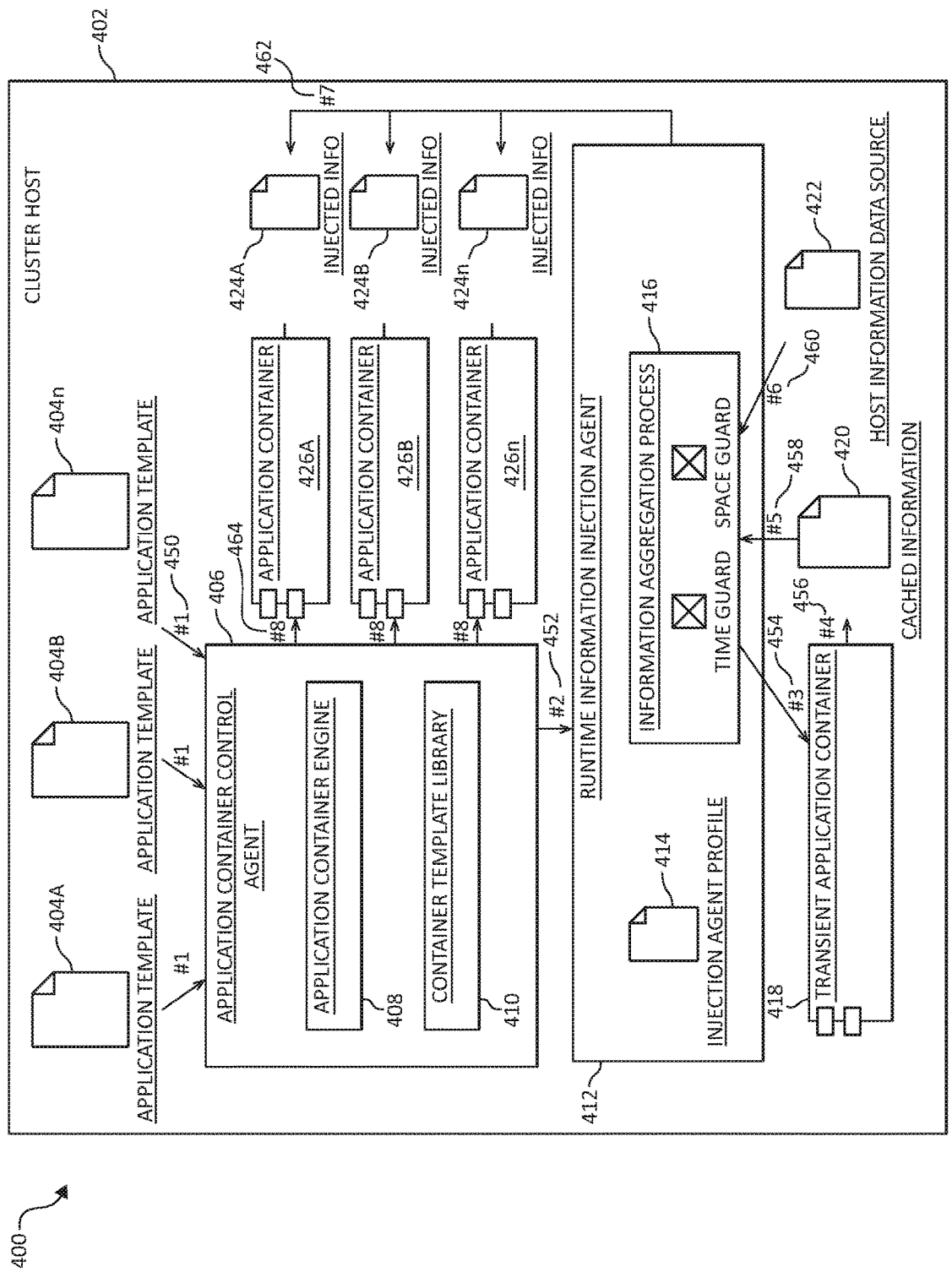
FIG. 4 is a combination block/flowchart diagram depicting exemplary systems for injecting cluster host information into an application container in accordance with aspects of the present invention.

Turning to FIG. 4, a combination block/flowchart diagram 400 depicting exemplary systems for injecting host information into an application container in accordance with one embodiment of the invention is depicted. As illustrated in FIG. 4, the system may include an application container control agent 406 for instantiating running application containers listed as 426A, 426B, and 426n, based on predefined application templates listed as 404A, 404B, and 404n. The system may also include a runtime information injection agent 412 that dynamically collects information of cluster host 402 and calculates information to be injected into application containers 426A-n and consumed by their applications.

In addition, and as will be described in detail below, the application container control agent 406 may include and/or interact with an application container engine 408 to start and manage application containers 426A-n. The application container control agent 406 may also include and/or interact with a container template library 410 to store and provide reusable container templates, that may include software and configurations that enable to run application containers based on the templates. In certain embodiments, instead of being an integral component, the application container engine 408 may be an external binary that is invoked by the application container control agent 406. Additionally, or alternatively, the container template library 410 may be an external repository for hosting container templates, and these container templates may be retrieved by the application container control agent 406 directly, or by the application container engine 408.

In certain embodiments, as shown with reference to numeral 1, the application container control agent 406 will instantiate an application container 426A-n based on an application template 404A-n (step 450). Such application templates 404A-n are fundamentally different from container templates hosted in the container template library 410. As will be described, while a container template packages necessary static information, such as the software of an application, its required libraries, configuration information, and a list of predefined users, the application template 404A-n specifies the runtime behavior of the application container 426A-n, such as the execution user of the application, and further information required for launching an application container.

In some embodiments, the application container control agent 406 will delegate to a runtime information injection agent 412 the task of performing necessary information collection and calculations, as illustrated referencing numeral 2. The behavior of the runtime information injection agent 412 may be configured by an injection agent profile 414 and executed by information aggregation process 416. The information aggregation process 416 combines information collected from a transient application container 418 and information collected from the host 402 (step 452). As referenced in numeral 3, the information aggregation process 416 launches the transient application container 418. This transient application container 418 generally utilizes the same container template as would be used by the working application containers 426A-n (step 454). The container template is generally an inert, immutable file that can serve as a snapshot of a given application container. These container templates can become large in size, and therefore, in certain embodiments, such a container template can be divided into common components, and different container templates may share a same set of common components.

In some embodiments, information of interest can be extracted from the transient application container 418 as referenced in numeral 4. Container specific data is collected from the transient application container 418, which serves as the information source that simulates a given container's runtime environment based on a specific container template. The runtime information injection agent 412 uses the transient application container 418 to retrieve this necessary runtime information (step 456). This information can be cached 420 in a storage managed by the runtime information injection agent 412 (step 458), referenced as numeral 5.

Additionally, or alternatively, to make sure the disk consumption of the cached data is within a reasonable bound, the information aggregation process 416 may delegate a space guard to prune off unnecessary files. The criterion and purging algorithm for such files can be further specified in injection agent profile 414. The purging algorithm may include several heuristic methods, such as Last-In-Last-Out (LILO), First-In-First-Out (FIFO), Least Recently Used (LRU), Most Recently Used (MRU), etc.

In some examples where the recency of this information is critical, a time guard component can additionally be enabled in the information aggregation process 416. This time guard component can be implemented in the simplest form as a timer (i.e., relying on an age of the information/data), or in more advanced form such as to extrapolate information based on a time-dependent logic. For example, in one embodiment, a certain property of a running container may be linear to time with a different initial value. This time guard may compute the most up-to-date value of a running application container 426A-n based on the cached information 420, and feed this data back to the runtime information injection agent 412.

In some embodiments, as referenced by numeral 6, host information is collected from a host information data source 422, and such sources include, but are not limited to, host configuration files, operating system information, local databases, environment variables, shared directories, and running processes or commands, that provide data of the host environment (step 460). The information aggregation process 416 consumes the cached information 420 and host information, optionally according to the specification of the injection agent profile 414, and/or relevant section in the application template 404A-n as directed by the application container control agent 406, and combine these information items according to a prescribed logic. The combined (aggregated) information is then presented, for instance, in the form of a file termed as "Injected Info" 424A-n, and stored in the storage managed by the runtime information injection agent 412, as referenced by numeral 7 (step 462).

Finally, the application container control agent 406 may then utilize the injected information files 424A-n to provision the working application containers 426A-n as referenced in numeral 8 (step 464). For certain application containers 426A-n having shared volumes on the cluster host 402, these injected information files 424A-n can be mounted into the working application container as auxiliary data volumes. In other examples, injected information files 424A-n can be presented as an additional common component into a container template, and new working containers may be started based on the new container template.

Continuing, FIG. 5 is a block diagram depicting a relevant data structure 500 of the application container control agent 406 in accordance with aspects of the present invention. As illustrated in FIG. 5, each application is represented by an application template 404A-n. The application container control agent 406 must properly schedule, orchestrate, and terminate the application containers 426A-n according to the specification in a given application template 404A-n. Fields of a generic application template 404A-n described herein, consist of the following data fields:

Container Template: The container template indicates the required runtime dependencies and libraries of the application container 426A-n. Container templates can be shared among different applications where the property of reusability can be utilized, as will be discussed following.

Container Engine: The container engine indicates the tooling that will create operating environment based on the container template for the application logic. The container engine may be a local executable creating running container instances directly. The container engine may also take the form of a local proxy that delegates work to a remote executable that instantiates the application containers 426A-n.

Command: The command indicates the application-specific procedure or program orthogonal to the running environment provided by the container engine based on a container template. This command may serve as the entry point of starting the actual application inside the container. Additionally, or alternatively, this command can be used as a vehicle in investigating the runtime environment inside the container.

Additional data fields, described herein, are necessary to the examples of runtime information injection. As elaborated in the next section, they control the content of injected information, and provide hints for the injection agent behavior.

Injection Agent: The injection agent comprises the component that gathers, processes, aggregates and presents the required information that will later be consumed by the application, or creates running environment for the running application.

Aggregation Mode: The aggregation mode indicates the action of the injection agent when processing information from both the application container and host environment. The potential values include, but are not limited to "merge" and "overwrite". Additional modes can be defined with respect to different ratios between the importance of container-specific information and host-generated information.

Execution User: The execution user indicates which container user will execute the command in the application container 426A-n. In some examples, the command may comprise executing a program or binary or script located in a shared volume. Access control may not be enforced for such a container user, as either this container user does not have sufficient privilege as host user or the user supersedes the privileges intended for the corresponding host user. As will be described further, the aforementioned problem can be addressed elegantly by the runtime injection system having the right set of information accumulated.

Host Information Metric: The host information metric indicates the target information that is intended to be harvested from the host information data source 422. In some embodiments, these metrics may comprise a list of keys to a specific table in a database for the injection agent to retrieve or may comprise an information template for the injection agent to fill in.

Figure 6:
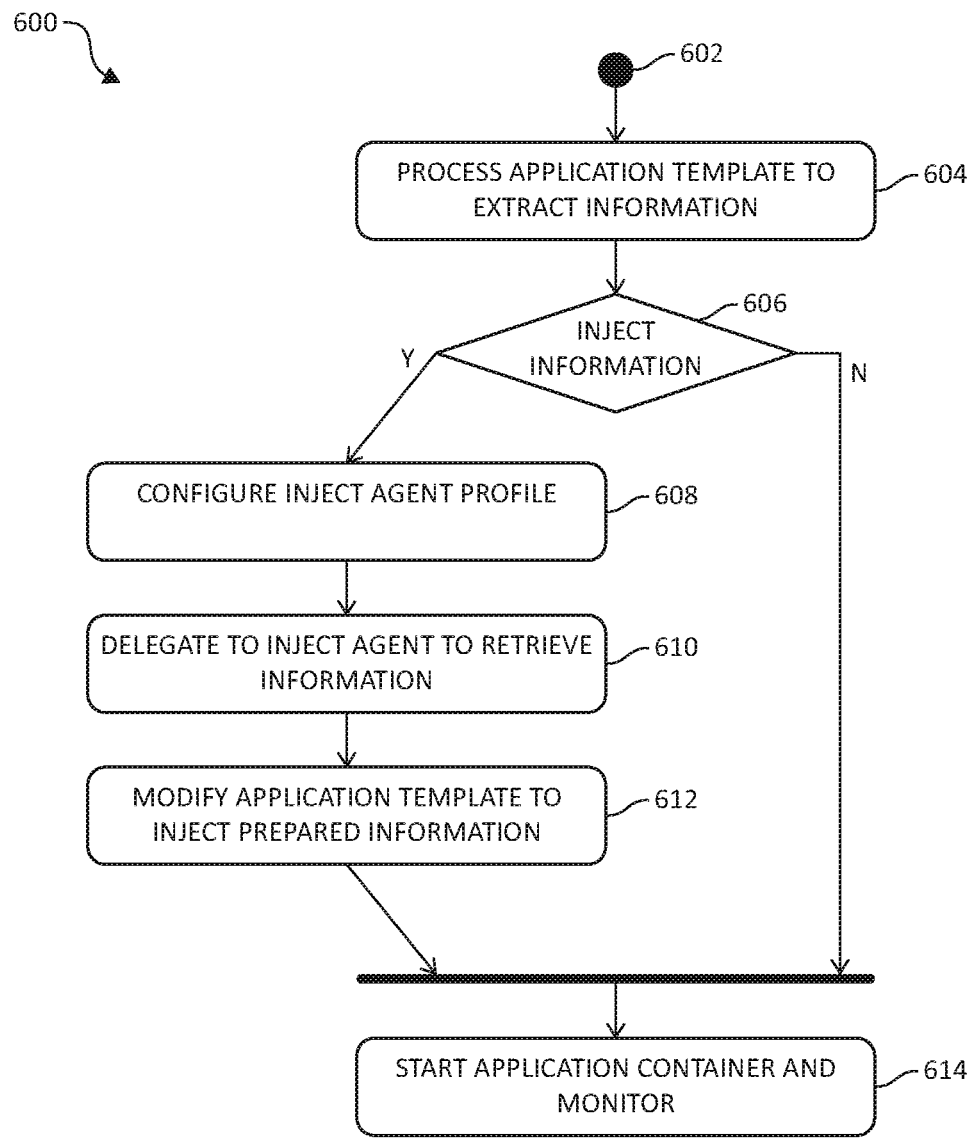
FIG. 6 is a flowchart diagram of an exemplary method for implementing an application container control logic, in accordance with aspects of the present invention.

Advancing, FIG. 6 is a flowchart diagram of an exemplary method 600 for implementing an application container control agent logic, in accordance with aspects of the present invention. The method 600 illustrates operations the application container control agent 406 may perform. Starting at step 602, a generic application container control agent 406 may use an application template 404A-n as the instruction to specify the organization, scheduling and dependencies between different working application containers 426A-n (step 604). These working application containers 426A-n can be coordinated to perform a unified task and be exposed as a single unit of work, or application.

A determination is made whether information is to be injected into the application container 426A-n (step 606). When no inject information section is specified, the application container 426A-n is created and executed, as specified in an associated application template 404A-n (step 614). For application containers 404A-n which require a lengthy amount of time to process its predetermined job, or in certain cases, are expected to run infinitely (such as web servers), the application container control agent 406 may also take over the responsibility of monitoring the health status of running containers. In some examples, high availability of container service is of great importance, such that the application container control agent 406 may also need to provide recover mechanisms should any given container fail.

Returning to step 606, embodiments that implement the behavior discussed above may be extended to support runtime information injection, since the application container control agent 406, by design, is able to control the starting sequence and timing of working application containers 426A-n. When a piece of injection information is required as indicated in the application template 404A-n, the application container control agent 406 configures the injection agent profile 414 first to set or overwrite the default state of the runtime information injection agent 412, to properly reflect the application context and control or fine-tune the injection behavior (step 608).

Upon completion of the configuration, the application container control agent 406 delegates the retrieval of required information to the runtime information injection agent 412 (step 610). Depending on the actual implementation, the runtime information injection agent 412 may be an integral part of the application container control agent 406, or the runtime information injection agent 412 may comprise an external plugin that abides the protocol that enables the application container control agent 406 to properly retrieve required information.

When the runtime information injection agent 412 has properly collected, calculated and prepared the required information, it will signal the application container control agent 406 to proceed. Before starting the application container 426A-n and monitoring the workload, the application container control agent 406 may need to update the application template 404A-n with a new set of information (step 612). For example, in certain embodiments where a host volume can be shared by application containers 426A-n, one or more volumes may be added for the application containers 426A-n so that the information can be properly injected. The injected information is used for creating and starting the application container 426A-n, as specified in an associated application template 404A-n (step 614).

Figure 7:
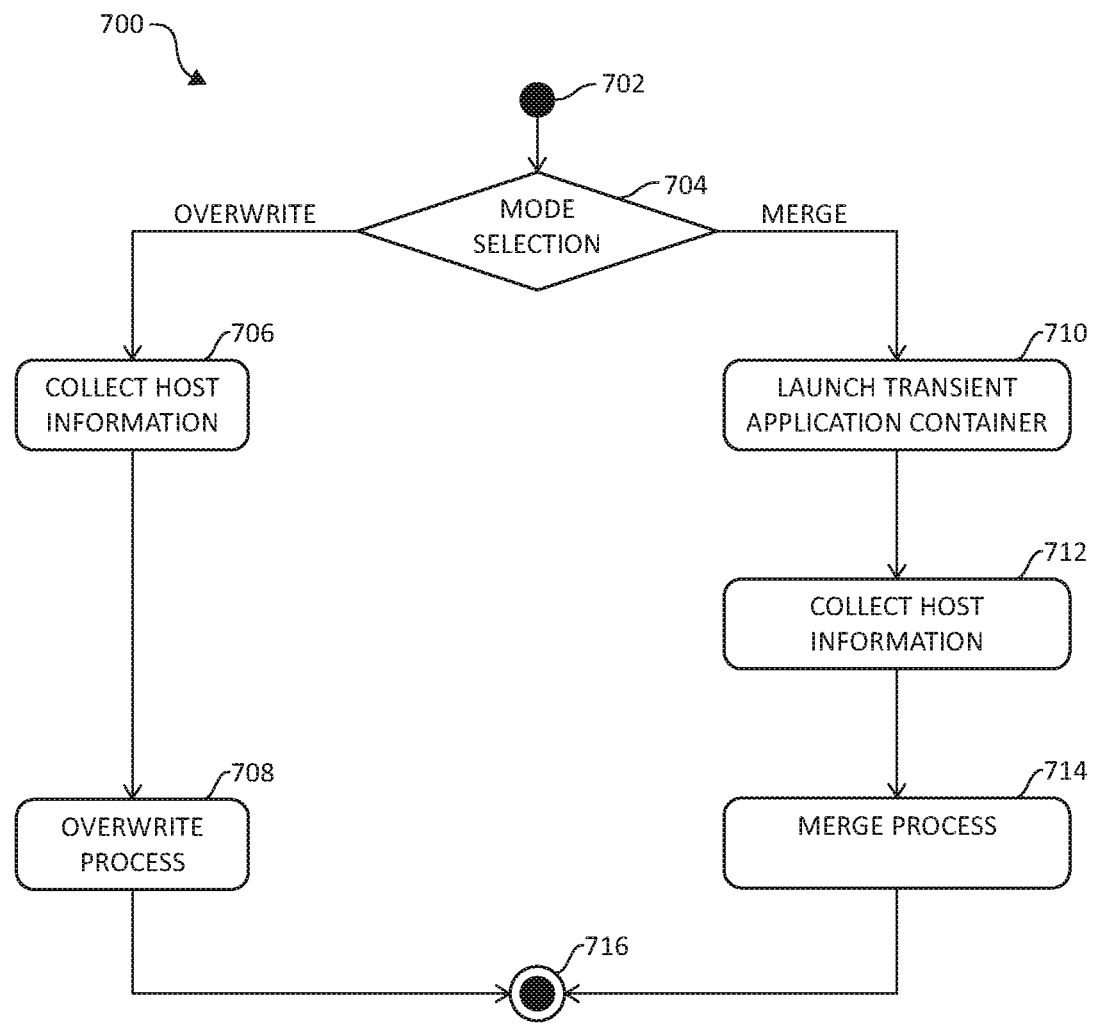
FIG. 7 is a flowchart diagram of an exemplary method for implementing an injection agent, in accordance with aspects of the present invention.

FIG. 7 is a flowchart diagram of an exemplary method 700 for implementing the injection agent, in accordance with embodiments of the information aggregation process. The method 700 starts (step 702) with a mode selection process. Such selection enables the runtime information injection agent 412 to have a fine-tuned aggregation behavior and puts weight on the importance of the different sources of extracted information. A determination of this mode selection (whether to overwrite or merge information) is performed at step 704.

In some examples, upon extracting information from the host 402 (step 706), this information extracted from the host 402 may be considered crucial while the container-specific extracted information is considered insignificant. In such case, container information may be overwritten directly with the calculated injected information (step 708) and injected into the application container 426A-n (step 716). Hence this mode is named "overwrite".

Returning to step 704, other examples require knowledge of both the host 402 and the given container, and both sets of information need to be merged together. One instance of this example is consistent with access control enforcement. While a container application has its own user space, the shared volume from the host will contaminate container user space with host access control rules. In cases where correctly enforcing both host access rules and container access rules are important, the running container needs to be aware of both the user space of the residing host and its own user space. This information must be merged together and exist within the application container 426A-n before its execution. In such case, a "merge" mode algorithm is performed.

When performing the merge mode operation, a transient application container 418 is launched to serve as the prototype container and provide the runtime information injection agent 412 and the application container control agent 406 the opportunity to investigate inside the container spaces (step 710). Depending on the actual implementation of such temporary container launch, the runtime information injection agent 412 and the application container control agent 406 may sample the information from the process space, user space, mount space, inter process communication space, network space, and/or Unix Timesharing System (UTS) space. Further, depending on the specification of the application container 426A-n, the runtime information injection agent 412 may additionally also inspect the transient application container 418 to retrieve the information about resource reservations, the default Linux capabilities and any populated environment settings for the processes running within. After a set of information aforementioned is collected, the runtime information injection agent 412 may choose to cache this information for future reference. Corresponding host-sourced information is additionally collected and may be optionally cached (step 712). Finally, both sets of information are merged together and are saved into a file (i.e., injected information files 424A-n) (step 714) to be injected (step 716). Here too, this injected information may also be cached for future reference.

Figure 8:
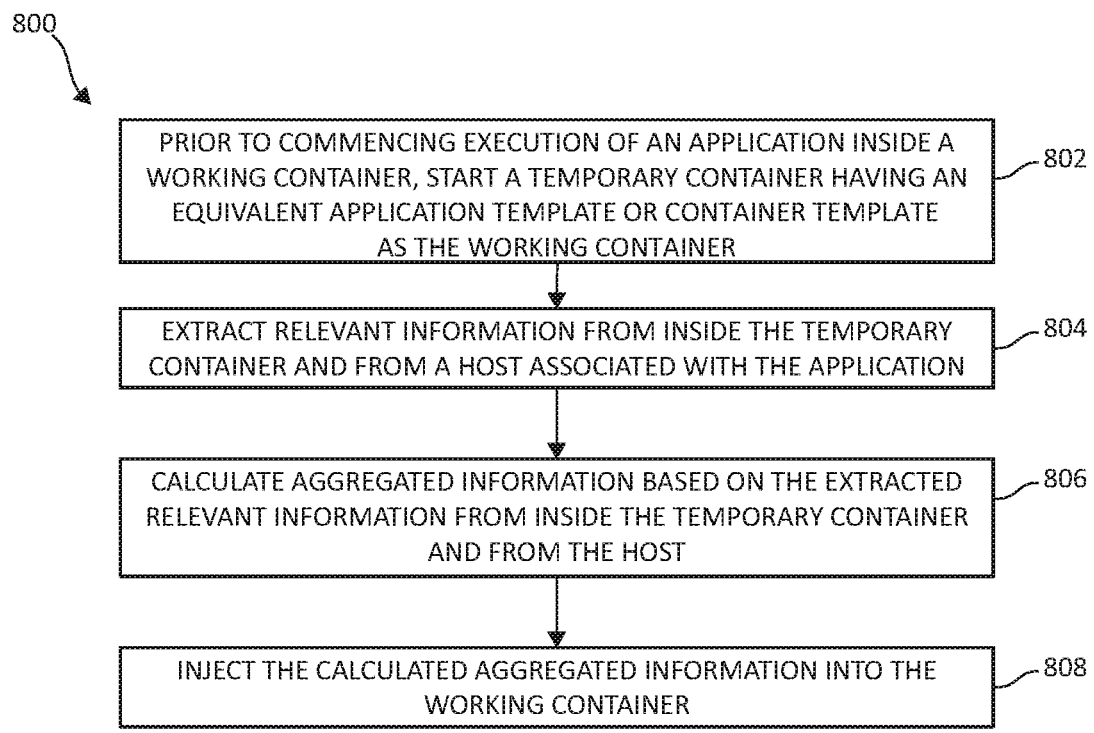
FIG. 8 is a flowchart diagram of an exemplary method for aggregated information calculation and injection for application containers by one or more processors, again in accordance with aspects of the present invention.

Concluding, FIG. 8 is a flowchart diagram of an exemplary method 800 for aggregated information calculation and injection for application containers by one or more processors, again in accordance with aspects of the present invention.

The method 800 begins when, prior to commencing execution of an application inside a working container, a temporary container having an equivalent application template as the working container is started (step 802). Relevant information is extracted from inside the temporary container and relevant information is additionally extracted from a host associated with the application (step 804). Aggregated information is calculated based on the extracted relevant information from inside the temporary container and from the host (step 806). The calculated aggregated information is then injected into the working container thereby efficiently propagating configuration attributes of the application into the working container (step 808).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for aggregated information calculation and injection for application containers, by a processor device, comprising:
   prior to commencing execution of an application inside a working container:
      starting a temporary container having an equivalent application template or container template as the working container;
      instantiating and executing a first instance of the application inside the temporary container;
      extracting relevant information obtained during execution of the first application instance from inside the temporary container and relevant information from a host associated with the application;
      calculating aggregated information based on the extracted relevant information from inside the temporary container and from the host; and
      commencing execution of a second instance of the application and injecting the calculated aggregated information into the working container using data volumes mounted into the working container; wherein the data volumes are shared with the host and include file permissions and access control rules associated with the data volumes as defined by the host.

2. The method of claim 1, wherein the calculated aggregated information comprises configuration information, run time information and characteristics of the application; and is stored by an information injection agent; and
   the application template comprises a specification of the container template, information for launching one of more of the application containers based on the container template, and further information.

3. The method of claim 2, further including performing at least one of:
   caching the relevant information extracted from inside the temporary container; and
   determining a disk consumption of the cached relevant information, wherein if the disk consumption exceeds a predetermined size threshold, using certain heuristics to exclude less required cached information to bring the disk consumption of the cached relevant information below the predetermined size threshold.

4. The method of claim 1, further including, while calculating the aggregated information, enabling a time guard component to ensure the relevant information extracted from inside the temporary container is current by performing at least one of:
   implementing a timer associated with a data age of the relevant information extracted from the temporary container; and extrapolating certain properties of the relevant information extracted from inside the temporary container according to a time-dependent logic.

5. The method of claim 1, wherein the relevant information extracted from the host is collected from a host information data source, including at least one of:
host static configuration files, local databases, environment variables, shared directories, and running processes or commands that provide data of the host.

6. The method of claim 1, further including weighting an importance of each of the relevant information extracted from inside the temporary container and the relevant information extracted from the host, wherein upon calculating the aggregated information, one of an overwrite mode selection and a merge mode selection is used when performing the aggregating depending on the weight of the importance determined.

7. A system for aggregated information calculation and injection for application containers, the system comprising:
a processor device executing instructions stored in a memory, wherein the processor device, prior to commencing execution of an application inside a working container:
starts a temporary container having an equivalent application template or container template as the working container;
instantiates and executes a first instance of the application inside the temporary container;
extracts relevant information obtained during execution of the first application instance from inside the temporary container and relevant information from a host associated with the application;
calculates aggregated information based on the extracted relevant information from inside the temporary container and from the host; and
commences execution of a second instance of the application and injects the calculated aggregated information into the working container using data volumes mounted into the working container; wherein the data volumes are shared with the host and include file permissions and access control rules associated with the data volumes as defined by the host.

8. The system of claim 7, wherein the calculated aggregated information comprises configuration information, run time information and characteristics of the application; and is stored by an information injection agent; and
the application template comprises a specification of the container template, information for launching one of more of the application containers based on the container template, and further information.

9. The system of claim 8, wherein the processor device performs at least one of:
caching the relevant information extracted from inside the temporary container; and
determining a disk consumption of the cached relevant information, wherein if the disk consumption exceeds a predetermined size threshold, using certain heuristics to exclude less required cached information to bring the disk consumption of the cached relevant information below the predetermined size threshold.

10. The system of claim 7, wherein the processor device, while calculating the aggregated information, enables a time guard component to ensure the relevant information extracted from inside the temporary container is current by performing at least one of:
implementing a timer associated with a data age of the relevant information extracted from the temporary container; and
extrapolating certain properties of the relevant information extracted from inside the temporary container according to a time-dependent logic.

11. The system of claim 7, wherein the relevant information extracted from the host is collected from a host information data source, including at least one of:
host static configuration files, local databases, environment variables, shared directories, and running processes or commands that provide data of the host.

12. The system of claim 7, wherein the processor device weights an importance of each of the relevant information extracted from inside the temporary container and the relevant information extracted from the host, wherein upon calculating the aggregated information, one of an overwrite mode selection and a merge mode selection is used when performing the aggregating depending on the weight of the importance determined.

13. A computer program product for aggregated information calculation and injection for application containers, by a processor device, the computer program product embodied on a non-transitory computer-readable storage medium having computer-readable program code portions stored therein, the computer-readable program code portions comprising:
an executable portion that, prior to commencing execution of an application inside a working container:
starts a temporary container having an equivalent application template or container template as the working container;
instantiates and executes a first instance of the application inside the temporary container;
extracts relevant information obtained during execution of the first application instance from inside the temporary container and relevant information from a host associated with the application;
calculates aggregated information based on the extracted relevant information from inside the temporary container and from the host; and
commences execution of a second instance of the application and injects the calculated aggregated information into the working container using data volumes mounted into the working container; wherein the data volumes are shared with the host and include file permissions and access control rules associated with the data volumes as defined by the host.

14. The computer program product of claim 13, wherein the calculated aggregated information comprises configuration information, run time information and characteristics of the application; and is stored by an information injection agent; and
the application template comprises a specification of the container template, information for launching one of more of the application containers based on the container template, and further information.

15. The computer program product of claim 14, further including an executable portion that performs at least one of:
caching the relevant information extracted from inside the temporary container; and
determining a disk consumption of the cached relevant information, wherein if the disk consumption exceeds a predetermined size threshold, using certain heuristics to exclude less required cached information to bring the disk consumption of the cached relevant information below the predetermined size threshold.

16. The computer program product of claim 13, further including an executable portion that, while calculating the aggregated information, enables a time guard component to ensure the relevant information extracted from inside the temporary container is current by performing at least one of:
- implementing a timer associated with a data age of the relevant information extracted from the temporary container; and
- extrapolating certain properties of the relevant information extracted from inside the temporary container according to a time-dependent logic.

17. The computer program product of claim 13, wherein the relevant information extracted from the host is collected from a host information data source, including at least one of:
- host static configuration files, local databases, environment variables, shared directories, and running processes or commands that provide data of the host.

18. The computer program product of claim 13, further including an executable portion that weights an importance of each of the relevant information extracted from inside the temporary container and the relevant information extracted from the host, wherein upon calculating the aggregated information, one of an overwrite mode selection and a merge mode selection is used when performing the aggregating depending on the weight of the importance determined.

* * * * *